United States Patent [19]

Sato

[11] Patent Number: 5,477,342
[45] Date of Patent: Dec. 19, 1995

[54] FACSIMILE MACHINE AND RECORDING CONTROL METHOD WITH VARIABLE POLYGON MIRROR ROTATION SPEED

[75] Inventor: Masaki Sato, Kawasaki, Japan

[73] Assignee: Ricoh Company, Ltd., Tokyo, Japan

[21] Appl. No.: 249,069

[22] Filed: May 24, 1994

Related U.S. Application Data

[63] Continuation of Ser. No. 991,950, Dec. 17, 1992, abandoned.

[30] Foreign Application Priority Data

Dec. 19, 1991 [JP] Japan ................................. 3-353946

[51] Int. Cl.⁶ .............................. H04N 1/46; H04N 1/36
[52] U.S. Cl. .......................... 358/481; 358/412; 358/420; 358/509; 358/300
[58] Field of Search .................................. 358/401, 406, 358/412, 420, 421, 481, 486, 505, 509, 300, 296; 359/212, 216, 234, 839

[56] References Cited

U.S. PATENT DOCUMENTS

| | | | |
|---|---|---|---|
| 4,130,838 | 12/1978 | St. John | 358/412 |
| 4,962,431 | 10/1990 | Imakawa et al. | 358/481 |
| 4,970,603 | 11/1990 | Kanai | 358/401 |
| 4,974,097 | 11/1990 | Kaneko et al. | 358/401 |
| 5,041,915 | 8/1991 | Hirota et al. | 358/434 |
| 5,047,871 | 9/1991 | Meyer et al. | 358/486 |
| 5,072,303 | 12/1991 | Silverberg | 358/486 |
| 5,105,284 | 4/1992 | Sakata et al. | 358/401 |
| 5,150,400 | 9/1992 | Ukegawa | 358/406 |
| 5,175,632 | 12/1992 | Hayashi et al. | 358/486 |
| 5,177,626 | 1/1993 | Nosaki et al. | 358/486 |

Primary Examiner—Edward L. Coles, Sr.
Assistant Examiner—Kimberly A. Williams
Attorney, Agent, or Firm—Oblon, Spivak, McClelland, Maier, & Neustadt

[57] ABSTRACT

A facsimile machine includes a first part for emitting a scanning light beam which is used to record information, a second part for rotating a polygon mirror which reflects the scanning light beam, a third part for receiving information from a source and for detecting a communication system Group III (G3) or Group IV (G4) employed to transmit the information from the source, and a fourth part for controlling a rotational speed of the polygon mirror via the second part depending on the communication system detected by the third part.

12 Claims, 3 Drawing Sheets

FACSIMILE MACHINE AND RECORDING CONTROL METHOD WITH VARIABLE POLYGON MIRROR ROTATION SPEED

This application is a continuation of application Ser. No. 07/991,950, filed on Dec. 17, 1992, now abandoned.

BACKGROUND OF THE INVENTION

The present invention generally relates to facsimile machines and recording control methods therefor, and more particularly to a facsimile machine which is provided with a communication means for communicating in both Group-III (G3) and Group-IV (G4) modes, and a recording control method for preventing deterioration of the image received in the G3 and G4 modes of such a facsimile machine.

According to the CCITT standards, the resolution in the main scanning direction is set to 8 lines/mm and the resolution in the sub scanning direction is set to 7.7 lines/mm or 3.85 lines/mm for the G3 mode. On the other hand, the resolution is set to 200 dots/inch (dpi) or 400 dpi for the G4 mode. The resolution of 8 lines/mm corresponds to 0.125 mm/dot, and the resolution of 7.7 lines/mm corresponds to 0.130 mm/dot. The resolution of 200 dpi corresponds to 0.127 mm/dot.

In other words, in the millimeter system, the dot width in the main scanning direction is narrower and the dot width in the sub scanning direction is wider compared to those of the inch system. Hence, the amount of information transmitted and received in the millimeter system is larger than that of the inch system for the main scanning direction and is smaller than that of the inch system for the sub scanning direction. For this reason, the line density must be switched for the case where the communication is made in the G3 mode and for the case where the communication is made in the G4 mode.

In a conventional facsimile machine which is provided with a communication means for communicating in both G3 and G4 modes, the system of a scanner and a plotter thereof is fixed and made to conform to either the millimeter system or the inch system. Accordingly, if a receiving facsimile machine having an inch system plotter receives image information from a transmitting facsimile machine having a millimeter system scanner in the G3 mode, for example, the recorded image output from the receiving facsimile machine is expanded in the main scanning direction and is reduced in the sub scanning direction compared to the original image transmitted from the transmitting facsimile machine. In order to eliminate this problem, pixels in the main scanning direction are decimated (or thinned out) and the lines in the sub scanning direction are added so as to match the magnifications of the original image and the recorded image.

However, if the number of pixels and lines are decreased or increased at the receiving facsimile machine depending on the scanner of the transmitting facsimile machine and the plotter of the receiving facsimile machine, there is a problem in that a complex signal processing must be carried out in the receiving facsimile machine. In addition, there are problems in that the original image cannot be reproduced with a fine fidelity and that the image quality of the recorded image becomes poor.

SUMMARY OF THE INVENTION

Accordingly, it is a general object of the present invention to provide a novel and useful facsimile machine and a recording control method therefor, in which the problems described above are eliminated.

Another and more specific object of the present invention is to provide a facsimile machine comprising first means for emitting a scanning light beam which is used to record information, second means for rotating a polygon mirror which reflects the scanning light beam, third means for receiving information from a source and for detecting a communication system employed to transmit the information from the source, and fourth means, coupled to the third means, for controlling a rotational speed of the polygon mirror via the second means depending on the communication system detected by the third means. According to the facsimile machine of the present invention, it is possible to record the received image information with a fine fidelity using a simple construction, regardless of the communication system employed at the source, that is, regardless of the system employed by a scanner of the source.

Still another object of the present invention is to provide a recording control method for controlling a recording operation of a facsimile machine which includes first means for emitting a scanning light beam which is used to record information and second means for rotating a polygon mirror which reflects the scanning light beam, comprising the steps of (a) receiving information from a source and for detecting a communication system employed to transmit the information from the source, and (b) controlling a rotational speed of the polygon mirror via the second means depending on the communication system detected by the step (a). According to the recording control method of the present invention, it is possible to record the received image information with a fine fidelity using a simple construction, regardless of the communication system employed at the source, that is regardless of the system employed by a scanner of the source.

Other objects and further features of the present invention will be apparent from the following detailed description when read in conjunction with the accompanying drawings.

DESCRIPTION OF THE PREFERRED EMBODIMENTS

Figure 1:
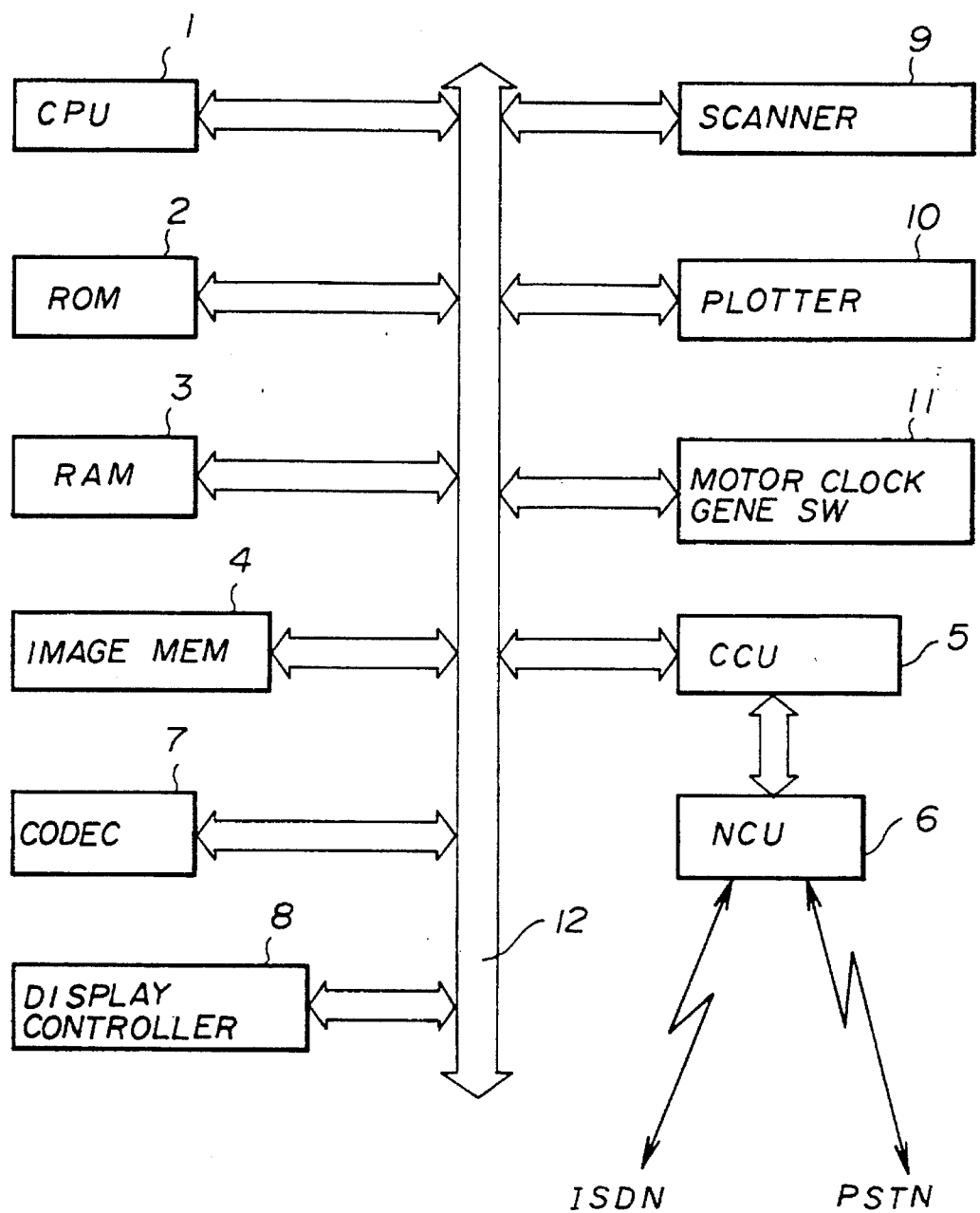
FIG. 1 is a system block diagram showing an embodiment of a facsimile machine according to the present invention.

FIG.1 shows an embodiment of a facsimile machine according to the present invention. The facsimile machine shown in FIG. 1 includes a central processing unit (CPU) 1, a read only memory (ROM) 2, a random access memory (RAM) 3, an image memory 4, a communication control unit (CCU) 5, a network control unit (NCU) 6, a coder-decoder (codec) 7, a display controller 8, a scanner 9, a plotter 10 and a motor clock generation switch 11 which are coupled via a bus 12.

The CPU 1 transmits and receives information via the CCU 5 based on operation programs stored in the ROM 2. The CPU 1 also manages the image memory 4, the codec 7, the display controller 8, the scanner 9, the plotter 10 and the motor clock generation switch 11 based on the operation programs stored in the ROM 2. The CCU 5 includes the functions of communicating in both the G3 and G4 modes, and controls the transmission and reception. The NCU 6 is coupled to ISDN and PSTN lines.

Figure 2:
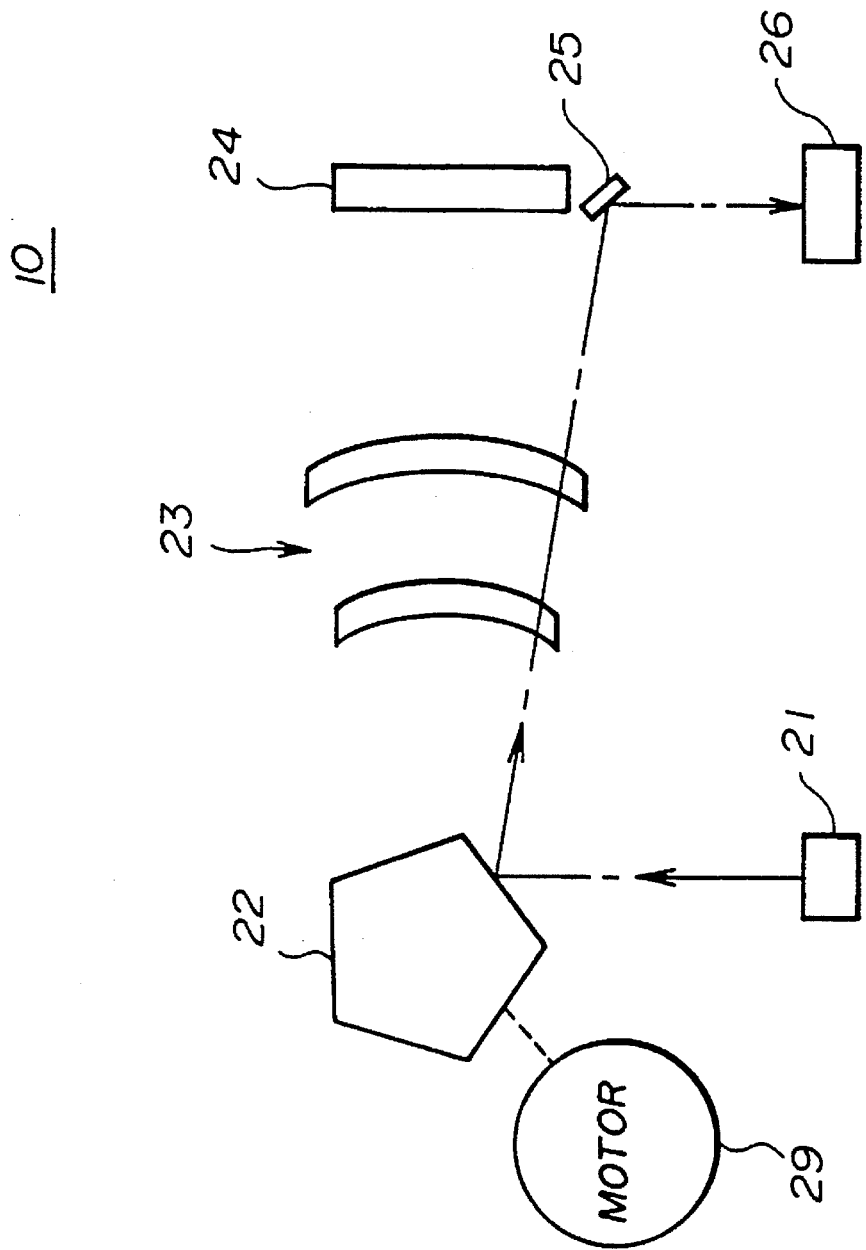
FIG. 2 is a diagram generally showing the construction of a plotter.

For example, the plotter 10 is made up of a laser beam printer, as shown in FIG. 2 which shows an essential part of the laser beam printer. In FIG. 2, a laser beam emitted from a laser unit 21 is deflected by a polygon mirror 22 which is rotated by a polygon motor 29, and passes through a fθ lens system 23 in order to correct the dot intervals to a constant value. The laser beam obtained through the fθ lens system 23 is then reflected by a write mirror 24 and is imaged on a photosensitive (or photoconductive) body (not shown).

Each mirror surface of the polygon mirror 22 is used to deflect the laser beam so as to scan one line in the main scanning direction. In order to keep the starting position of each line in the main scanning direction constant, a synchronizing mirror 25 and a synchronization detection unit 26 are provided on the outer side of the write mirror 24. The synchronizing mirror 25 and the synchronization detection unit 26 are used to adjust the timing with which the irradiation of the laser beam on the photosensitive body starts. The motor clock generation switch 11 switches the rotational speed of the polygon motor depending on the communication system of the information received by the CCU 5.

Figure 3:
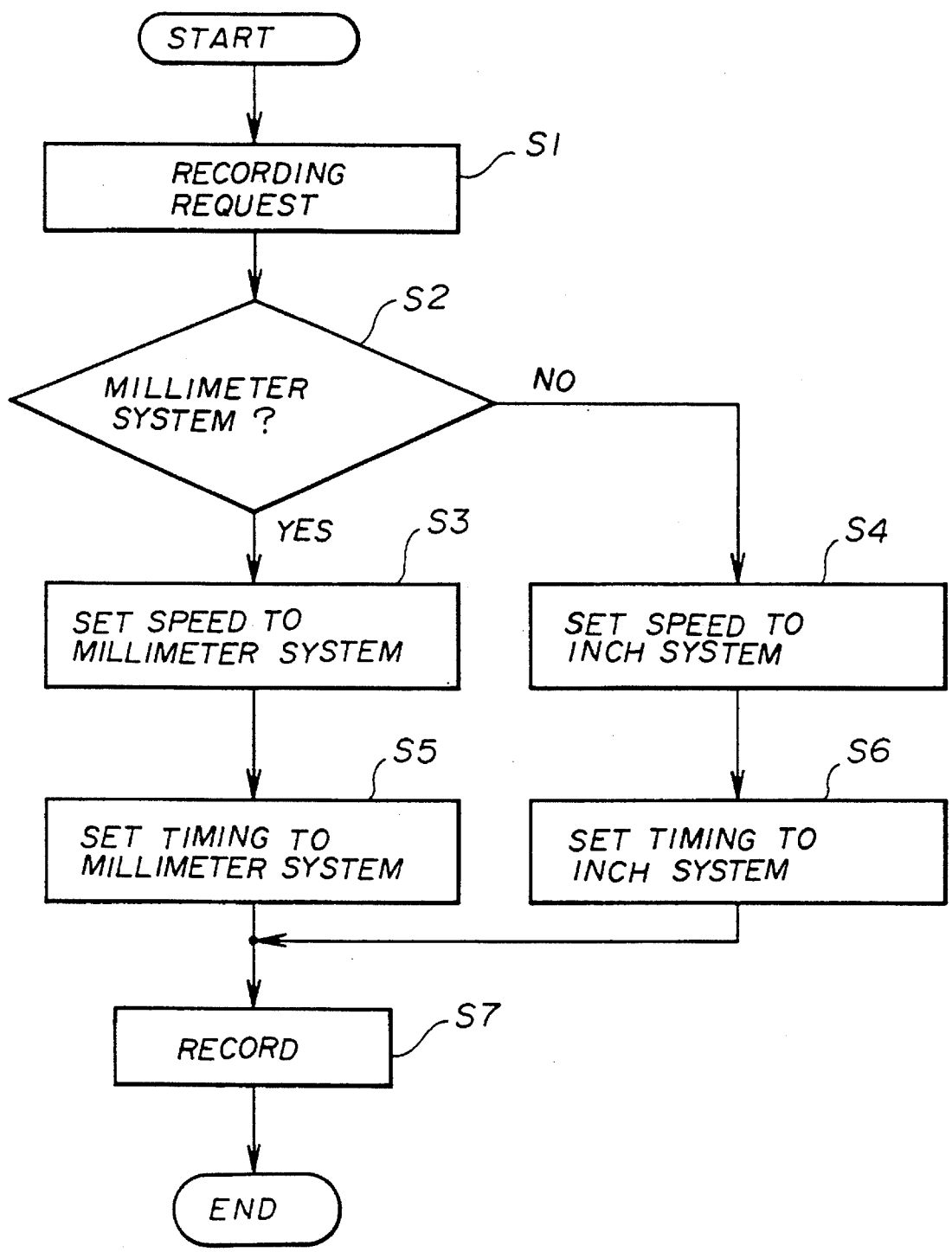
FIG. 3 is a flow chart for explaining an embodiment of a recording control method according to the present invention.

Next, a description will be given of the operation of this embodiment when recording the received image information on the plotter 10, by referring to FIG. 3. FIG. 3 shows a flow chart for explaining the operation of this embodiment of the facsimile machine according to the present invention, that is, an embodiment of a recording control method according to the present invention.

In FIG. 3, when the CCU 5 receives image information and there is a recording request in a step S1, a decision is made in a step S2 to determine whether the received image information is received in the G3 or G4 mode, that is, whether or not the received image information was transmitted from a millimeter system scanner. The decision result in the step S2 is YES if the received image information was transmitted from the millimeter system scanner, and is NO if the received image information was transmitted from the inch system scanner. As described above, the CCU 5 includes the functions of communicating in both the G3 and G4 modes. For this reason, the image information may be received in the G3 mode in the millimeter system or, received in the G4 mode in the inch system. In either case, the received image information must be correctly reproduced and recorded on a recording sheet in conformance with the CCITT standards.

If the received image information is in the millimeter system and the decision result in the step S2 is YES, the motor clock generation switch 11 switches and sets the rotational speed of the polygon motor 29 to the rotational speed for the millimeter system in a step S3. On the other hand, if the received image information is in the inch system and the decision result in the step S2 is NO, the motor clock generation switch 11 switches and sets the rotational speed of the polygon motor 29 to the rotational speed for the inch system in a step S4.

In other words, if the image clock used to generate the laser beam is kept constant and the rotational speed of the polygon motor 29 is increased, a dot becomes thicker in the main scanning direction and thinner in the sub scanning direction. The resolution of the millimeter system is 0.125 mm/dot for 8 lines/mm, and 0.130 mm/dot for 7.7 lines/mm. In addition, the resolution of the inch system is 0.127 mm/dot for 200 dpi. Hence, if the rotational speed of the polygon motor 29 in the plotter 10 which is made in the millimeter system is multiplied by 1.0193 which is a root of 8/7.7, the error with respect to 200 dpi of the inch system becomes 0.3% which is within 1% error of the CCITT standards. Accordingly, by varying the rotational speed of the polygon motor 29 depending on the scanner of the transmitting facsimile machine, the rotation of the polygon mirror 22 which deflects the laser beam for scanning is varied so as to match the line density of the image which is to be recorded on the plotter 10 of the receiving facsimile machine to the resolution of the scanner of the transmitting facsimile machine.

After the step S3, the CPU 1 in a step S5 switches the timing with which the laser unit 21 emits the laser beam depending on the rotational speed of the polygon motor 29 set in the step S3, and the process advances to a step S7. Similarly, the CPU 1 in a step S6 switches the timing with which the laser unit 21 emits the laser beam depending on the rotational speed of the polygon motor 29 set in the step S4, and the process advances to the step S7. The plotter 10 records the received image information in the step S7.

If the time interval from the time when the synchronization is detected by the synchronization detection unit 26 to the time when the irradiation of the laser beam starts is kept constant when the rotational speed of the polygon motor 29 is switched, the write starting position on the recording sheet in the main scanning direction becomes different between the millimeter system and the inch system. For this reason, the timing with which the irradiation of the laser beam starts is switched between the millimeter system and the inch system depending on the ratio of the rotational speeds of the polygon motor 29 in the case of the millimeter system and the inch system, so as to prevent the write starting position on the recording sheet in the main scanning direction from becoming different.

Further, the present invention is not limited to these embodiments, but various variations and modifications may be made without departing from the scope of the present invention.

What is claimed is:

1. A facsimile machine comprising:

first means for emitting a scanning light beam which is used to record recording information;

second means for rotating a polygon mirror which reflects the scanning light beam;

third means for receiving transmission information from a source and for detecting whether a first Group III facsimile communication system or a second Group IV facsimile communication system is employed to transmit the transmission information from the source;

fourth means, coupled to said third means, for controlling a rotational speed of the polygon mirror via said second means depending on whether the first or second facsimile communication system is detected by said third means; and fifth means for controlling a timing with which said first means starts to emit the scanning light beam depending on whether the first or second facsimile communication system is detected by the third means.

2. A facsimile machine comprising:

first means for emitting a scanning light beam which is used to record recording information;

second means for rotating a polygon mirror which reflects the scanning light beam;

third means for receiving transmission information from a source and for detecting whether a first Group III facsimile communication system or a second Group IV facsimile communication system is employed to transmit the transmission information from the source;

fourth means, coupled to said third means, for controlling a rotational speed of the polygon mirror via said second means depending on whether the first or second facsimile communication system is detected by said third means; and fifth means for detecting and adjusting synchronization of starting positions of each scan made by the scanning light beam.

3. The facsimile machine as claimed in claim 2, which further comprises sixth means for controlling a time interval from a time when said fifth means detects the synchronization to a time when said first means starts to emit the scanning light beam depending on whether the first or second facsimile communication communication system is detected by the third means.

4. A recording control method for controlling a recording operation of a facsimile machine which includes first means for emitting a scanning light beam which is used to record recording information, and second means for rotating a polygon mirror which reflects the scanning light beam, said recording control method comprising the steps of:

(a) receiving transmission information from a source and for detecting whether a first Group III facsimile communication system or a second Group IV facsimile communication system is employed to transmit the transmission information from the source;

(b) controlling a rotational speed of the polygon mirror via the second means depending on whether the first or second facsimile communication system is detected by said step (a); and (c) controlling a timing with which the first means starts to emit the scanning light beam depending on whether the first or second facsimile communication system is detected by said step (a).

5. A recording control method for controlling a recording operation of a facsimile machine which includes first means for emitting a scanning light beam which is used to record recording information, and second means for rotating a polygon mirror which reflects the scanning light beam, said recording control method comprising the steps of:

(a) receiving transmission information from a source and for detecting whether a first Group III facsimile communication system or a second Group IV facsimile communication system is employed to transmit the transmission information from the source;

(b) controlling a rotational speed of the polygon mirror via the second means depending on whether the first or second facsimile communication system is detected by said step (a); and (c) detecting and adjusting synchronization of starting positions of each scan made by the scanning light beam.

6. The recording control method as claimed in claim 5, which further comprises the steps of:

(d) controlling a time interval from a time when said step (d) detects the synchronization to a time when the first means starts to emit the scanning light beam depending on whether the first or second facsimile communication system is detected by said step (a).

7. A facsimile machine comprising:

first means for emitting a scanning light beam which is used to record recording information;

second means for rotating a polygon mirror which reflects the scanning light beam, wherein a latent image is formed on a photosensitive body by the scanning light beam reflecting off the polygon mirror to scan the photosensitive body;

third means for receiving transmission information from a source and for detecting whether a first Group III facsimile communication system or a second Group IV facsimile communication system is employed to transmit the transmission information from the source;

fourth means, coupled to said third means, for controlling a rotational speed of the polygon mirror via said second means depending on whether the first or second facsimile communication system is detected by said third means; and fifth means for controlling a timing with which said first means starts to emit the scanning light beam depending on the whether the first or second facsimile communication system is detected by the third means.

8. A facsimile machine comprising:

first means for emitting a scanning light beam which is used to record recording information;

second means for rotating a polygon mirror which reflects the scanning light beam, wherein a latent image is formed on a photosensitive body by the scanning light beam reflecting off the polygon mirror to scan the photosensitive body;

third means for receiving transmission information from a source and for detecting whether a first group III facsimile communication system or a second group IV facsimile communication system is employed to transmit the transmission information from the source;

fourth means coupled to said third means, for controlling a rotational speed of the polygon mirror via said second means depending on whether the first or second facsimile communication system is detected by said third means; and fifth means for detecting and adjusting synchronization of starting positions of each scan made by the scanning light beam.

9. The facsimile machine as claimed in claim 8, which further comprises sixth means for controlling a time interval from a time when said fifth means detects the synchronization to a time when said first means starts to emit the scanning light beam depending on whether the first or second facsimile communication system is detected by the third means.

10. A recording control method for controlling a recording operation of a facsimile machine which includes first means for emitting a scanning light beam which is used to record recording information, and second means for rotating a polygon mirror which reflects the scanning light beam, said recording control method comprising the steps of:

(a) receiving transmission information from a source and for detecting whether a first Group III facsimile communication system or a second Group IV facsimile communication system is employed to transmit the transmission information from the source;

(b) selectively switching a rotational speed of the polygon mirror via the second means depending on whether the first or second facsimile communication system is detected by said step (a); and (c) controlling a timing with which the first means starts to emit the scanning light beam depending on whether the first or second facsimile communication system is detected by said step (a).

11. A recording control method for controlling a recording operation of a facsimile machine which includes first means for emitting a scanning light beam which is used to record recording information, and second means for rotating a polygon mirror which reflects the scanning light beam, said recording control method comprising the steps of:

(a) receiving transmission information from a source and for detecting whether a first facsimile communication system or a second facsimile communication system is employed to transmit the transmission information from the source;

(b) selectively switching a rotational speed of the polygon mirror via the second means depending on whether the first or second facsimile communication system is detected by said step (a); and (c) detecting and adjusting synchronization of starting positions of each scan made by the scanning light beam.

12. The recording control method as claimed in claim 11, which further comprises the steps of:

(d) controlling a time interval from a time when said step (c) detects the synchronization to a time when the first means starts to emit the scanning light beam depending on whether the first or second facsimile communication system is detected by said step (a).

* * * * *